(12) United States Patent
Densborn et al.

(10) Patent No.: US 10,954,910 B2
(45) Date of Patent: Mar. 23, 2021

(54) STARTING DEVICE FOR STARTING A COMBUSTION ENGINE AND HANDHELD WORK APPARATUS HAVING SAID STARTING DEVICE

(71) Applicant: Andreas Stihl AG & Co. KG, Waiblingen (DE)

(72) Inventors: Gerd Densborn, Waiblingen (DE); Harald Schliemann, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 163 days.

(21) Appl. No.: 16/356,861

(22) Filed: Mar. 18, 2019

(65) Prior Publication Data

US 2019/0285042 A1    Sep. 19, 2019

(30) Foreign Application Priority Data

Mar. 16, 2018  (DE) .......................... 102018002133.6

(51) Int. Cl.
| | |
|---|---|
| *F02N 15/02* | (2006.01) |
| *F02N 3/02* | (2006.01) |
| *F02N 5/02* | (2006.01) |
| *F16D 41/12* | (2006.01) |
| *F02N 19/00* | (2010.01) |

(Continued)

(52) U.S. Cl.
CPC ........... *F02N 15/023* (2013.01); *A01G 20/47* (2018.02); *F02N 3/02* (2013.01); *F02N 5/02* (2013.01); *F02N 15/006* (2013.01); *F02N 15/027* (2013.01); *F02N 19/001* (2013.01); *F16D 41/12* (2013.01); *F02N 2250/00* (2013.01)

(58) Field of Classification Search
CPC .... F02N 15/023; F02N 15/006; F02N 15/027; F02N 3/02; F02N 5/02; F02N 19/001; F02N 2250/00; A01G 20/47; F16D 41/12
See application file for complete search history.

(56) References Cited

U.S. PATENT DOCUMENTS

| | | | | |
|---|---|---|---|---|
| 3,565,050 | A | * | 2/1971 | Clymer .................... F02N 3/02 123/185.5 |
| 3,754,543 | A | * | 8/1973 | Harkness .................. F02N 3/02 123/185.3 |

(Continued)

FOREIGN PATENT DOCUMENTS

| | | |
|---|---|---|
| DE | 102 09 012 A1 | 2/2003 |
| DE | 10209012 A1 | 2/2003 |

(Continued)

*Primary Examiner* — David Hamaoui
(74) *Attorney, Agent, or Firm* — Walter Ottesen, P.A.

(57) ABSTRACT

A starting device for a combustion engine includes a housing relative to which a rope pulley, a spring housing and an entrainer can rotate about a rotation axis. A coupling unit produces a rotationally-fixed connection between the rope pulley and the spring housing in response to a rotational movement of the rope pulley in a starting direction. The spring housing has a spring receiving space for a tension spring and is connected to an entrainer by the spring. The coupling unit has a first coupling element and a second coupling element, which interact at a contact location which is at a spacing (d) to the rotation axis and is at least as large as the maximum spacing (c) of the tension spring to the rotation axis.

17 Claims, 8 Drawing Sheets

(51) Int. Cl.
   *F02N 15/00* (2006.01)
   *A01G 20/47* (2018.01)

(56) References Cited

U.S. PATENT DOCUMENTS

| | | | | |
|---|---|---|---|---|
| 6,199,529 | B1 * | 3/2001 | Kuwabara | F02B 63/02 |
| | | | | 123/179.24 |
| 6,588,390 | B2 * | 7/2003 | Kawasaki | F02N 3/02 |
| | | | | 123/185.3 |
| 6,679,217 | B2 * | 1/2004 | Nieda | F02N 3/02 |
| | | | | 123/185.14 |
| 6,722,336 | B2 * | 4/2004 | Nieda | F02N 3/02 |
| | | | | 123/185.14 |
| 6,739,303 | B2 * | 5/2004 | Harada | F02N 3/02 |
| | | | | 123/185.14 |
| 7,069,896 | B2 | 7/2006 | Tsunoda et al. | |
| 7,174,874 | B2 | 2/2007 | Horikoshi | |
| 7,252,065 | B1 * | 8/2007 | Keeton | F02N 3/02 |
| | | | | 123/185.14 |
| 9,322,377 | B2 * | 4/2016 | Matsui | F02N 3/02 |
| 2002/0121258 | A1 | 9/2002 | Nieda et al. | |

FOREIGN PATENT DOCUMENTS

| | | | |
|---|---|---|---|
| EP | 1413747 | A2 | 4/2004 |
| EP | 1645751 | A2 | 4/2006 |
| JP | 07017810 | Y | 4/1995 |
| JP | 2003097396 | A | 4/2003 |
| JP | 2004169553 | A | 6/2004 |

\* cited by examiner

STARTING DEVICE FOR STARTING A COMBUSTION ENGINE AND HANDHELD WORK APPARATUS HAVING SAID STARTING DEVICE

CROSS REFERENCE TO RELATED APPLICATION

This application claims priority of German patent application no. 10 2018 002 133.6, filed Mar. 16, 2018, the entire content of which is incorporated herein by reference.

FIELD OF THE INVENTION

The invention relates to a starting device for starting a combustion engine, and to a handheld work apparatus having a starting device.

BACKGROUND OF THE INVENTION

US 2002/0121258 has disclosed a starting device for a combustion engine. The starting device has a spring store which has a spiral spring arranged in an inner housing. On the outer circumference of the inner housing, there is arranged a coupling unit which permits a rotation of the inner housing only in one rotational direction. The starting device has a rope reel which is coupled by means of a ratchet return mechanism to the inner housing.

SUMMARY OF THE INVENTION

It is an object of the invention to provide a starting device for starting a combustion engine, which has a simplified construction. A further object of the invention is to provide a handheld work apparatus having a starting device with advantageous construction.

The invention provides a starting device having a first coupling unit. The first coupling unit produces a rotationally conjoint connection between the rope pulley and the spring housing in the event of a rotational movement of the rope pulley in a starting direction, and acts as a freewheel between the rope pulley and the spring housing in the event of a rotational movement of the rope pulley in an opposite direction which is opposite to the starting direction. In this way, a tension spring of the starting device can be tightened and tensioned over multiple starting throws. The first coupling unit has at least one first coupling element and at least one second coupling element which interact at at least one first contact location when the rotationally conjoint connection between rope pulley and spring housing is produced. Provision is made for the at least one first contact location to have a spacing to the rotational axis, which spacing is at least as large as the maximum spacing of the tension spring to the rotational axis.

According to the invention, the coupling unit between rope pulley and spring housing is accordingly not, as in the prior art, arranged close to the rotational axis in a structural space formed between rope pulley and the spring receiving space in an axial direction of the rotational axis. Instead, the first coupling unit is arranged such that the at least one first contact location has a radial spacing to the rotational axis, which radial spacing is at least as large as the maximum spacing of the tension spring to the rotational axis. Owing to the relatively large spacing of the at least one first contact location to the rotational axis and the resulting relatively large lever arm, the coupling elements can, to transmit a predefined torque, be dimensioned to be relatively small. It has furthermore been found that, by means of the arrangement according to the invention of the coupling elements, the axial structural space of the starting device can be reduced, because the spring housing can be arranged closer to the rope pulley in the axial direction of the rotational axis than in the prior art. This is advantageous in particular in the case of the starting device being used in handheld work apparatuses, because, in the case of handheld work apparatuses, the structural space in the direction of the rotational axis is in many cases of importance for the ergonomic handling and usability of the work apparatus. Even a structural space saving of a few millimeters can yield a considerable advantage here. It is advantageous for all coupling elements of the first coupling unit to be situated radially between spring housing and rope pulley, and in particular with their entire extent radially outside the spring receiving space.

In an advantageous configuration, the first coupling unit and the tension spring overlap in an axial direction of the rotational axis. The first coupling unit and the tension spring are accordingly not, as in the prior art, arranged adjacent to one another with respect to the axial direction of the rotational axis. In other words, provision is advantageously made for the structural space taken up by the tension spring in the axial direction of the rotational axis and the structural space taken up by the first coupling unit in the axial direction of the rotational axis to at least partially overlap. In this way, a compact construction of the starting device can be achieved in a simple manner.

An advantageous compact construction is achieved if one of the two interacting coupling elements of the first coupling unit is arranged on the spring housing and the other of the two coupling elements of the first coupling unit is arranged on a concave inner circumferential surface of the rope pulley. For this purpose, provision is particularly preferably made for the rope pulley to at least partially engage over the spring housing. In this way, a particularly advantageous, compact arrangement of the first coupling unit is made possible.

It is advantageous for a first coupling element and a second coupling element of a second coupling unit to interact at a second contact location. The at least one second contact location advantageously has a spacing to the rotational axis, which spacing is at least as large as the maximum spacing of the tension spring to the rotational axis. Both the first contact location and the second contact location are accordingly arranged with a spacing to the rotational axis which is larger than the maximum spacing of the tension spring to the rotational axis. The two coupling units may accordingly be arranged such that their contact locations are situated radially outside the tension spring. It is advantageous for all coupling elements of the first coupling unit and all coupling elements of the second coupling unit to be situated radially outside the spring receiving space. The largest spacing of the entrainer to the rotational axis is advantageously smaller than the spacing of the at least one first contact location to the rotational axis. The largest spacing of the entrainer to the rotational axis is in particular smaller than the spacing of the at least one second contact location to the rotational axis.

In a preferred embodiment, the at least one first coupling element of the first coupling unit and the at least one first coupling element of the second coupling unit are in each case a latch. The at least one second coupling element of the first coupling unit and the at least one second coupling element of the second coupling unit are advantageously in each case a detent cam. It is preferable for at least one latch of the one coupling unit and the at least one detent cam of the other coupling unit to be arranged on the spring housing. This yields a simple, advantageous construction. It may however also be expedient for coupling elements of the same type for the first coupling unit and the second coupling unit to be provided on the spring housing. It is accordingly possible, for example, for latches of the first coupling unit and latches of the second coupling unit to be arranged on the spring housing. In an alternative embodiment, detent cams of the first coupling unit and detent cams of the second coupling unit may be arranged on the spring housing. It is preferable for at least one latch of the first coupling unit and at least one detent cam of the second coupling unit to be arranged on the spring housing.

In a particularly advantageous configuration, the at least one first contact location of the first coupling unit is arranged in a first axial section of the starting device and the at least one second contact location of the second coupling unit is arranged in a second axial section of the starting device. The first axial section and the second axial section advantageously do not overlap in the direction of the rotational axis. In a particular advantageous configuration, the first axial section and the second axial section have a spacing to one another in the axial direction of the rotational axis. Here, the spacing is advantageously selected such that the coupling elements of the first coupling unit cannot interact with the coupling elements of the second coupling unit even in the case of an adverse tolerance situation. The axial spacing advantageously amounts to 1 mm to 15 mm. The first axial section of the starting device is in particular assigned a first longitudinal section of the spring housing, and the second axial section of the starting device is in particular assigned a second longitudinal section of the spring housing.

It is advantageous for at least one coupling element mounted on the spring housing to be a latch, and for the mounting location of the at least one latch mounted in the spring housing to be arranged radially outside the spring receiving space with respect to the rotational axis. This yields a compact construction of the arrangement. In a particularly preferred configuration, the entire latch is arranged radially outside the spring receiving space with respect to the rotational axis.

In an advantageous configuration, the first coupling unit and the second coupling unit overlap in a radial direction of the rotational axis. In a particularly advantageous configuration, at least one coupling element of the first coupling unit and at least one coupling element of the second coupling unit are arranged with approximately the same spacing to the rotational axis.

It is particularly advantageous for the spring housing and the rope pulley to overlap in an axial direction of the rotational axis. The spring housing and the rope pulley preferably overlap in the first axial section of the starting device in the axial direction of the rotational axis. The spring housing advantageously has a width measured in the direction of the rotational axis. The rope pulley advantageously has a recess into which the spring housing projects. In a particular advantageous configuration, the rope pulley and the spring housing have an axial overlap which amounts to at least 25% of the width of the spring housing. A compact construction of the starting device is thus attained. The rope pulley advantageously engages over the spring housing.

In a preferred configuration, the spring housing has a bearing dome for the mounting of the spring housing on a bearing pin of the housing. The bearing dome advantageously projects into the spring receiving space. The bearing dome is accordingly situated at least partially in the same axial structural space as the tension spring. In this way, a compact construction and an expedient introduction of force into the bearing point are achieved. Tilting moments generated by the coupling units on the bearing point of the spring housing can be kept low. By virtue of the fact that the first coupling unit does not engage on the bearing dome, the bearing dome can be arranged so as to yield an expedient introduction of force. The entrainer advantageously overlaps the bearing dome of the spring housing in the axial direction of the rotational axis. In this way, a small structural size in the axial direction of the rotational axis can be achieved. In a particularly advantageous configuration, the entrainer engages over the bearing dome of the spring housing.

In an advantageous configuration, at least one coupling unit comprises at least two first coupling elements which are acted on by a single spring. In a particularly preferred configuration, all of the coupling elements of a coupling unit are acted on by a single spring. It is particularly preferable for all first coupling elements of the first coupling unit to be acted on by a first spring, and for all first coupling elements of the second coupling unit to be acted on by a second spring.

In an advantageous configuration, the spring has the form of a ring segment and acts on the at least two first coupling elements in a radial direction with respect to the rotational axis. In an advantageous configuration, the spring acts on the coupling elements in the direction of the coupled position, in which the first coupling elements interact with the second coupling elements.

For a handheld work apparatus having a starting device according to the invention, provision is made for the work apparatus to comprise a combustion engine with a crankshaft, and for the starting device to be coupled by means of a third coupling unit to the crankshaft of the work apparatus. The third coupling unit advantageously comprises coupling elements arranged on the entrainer.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
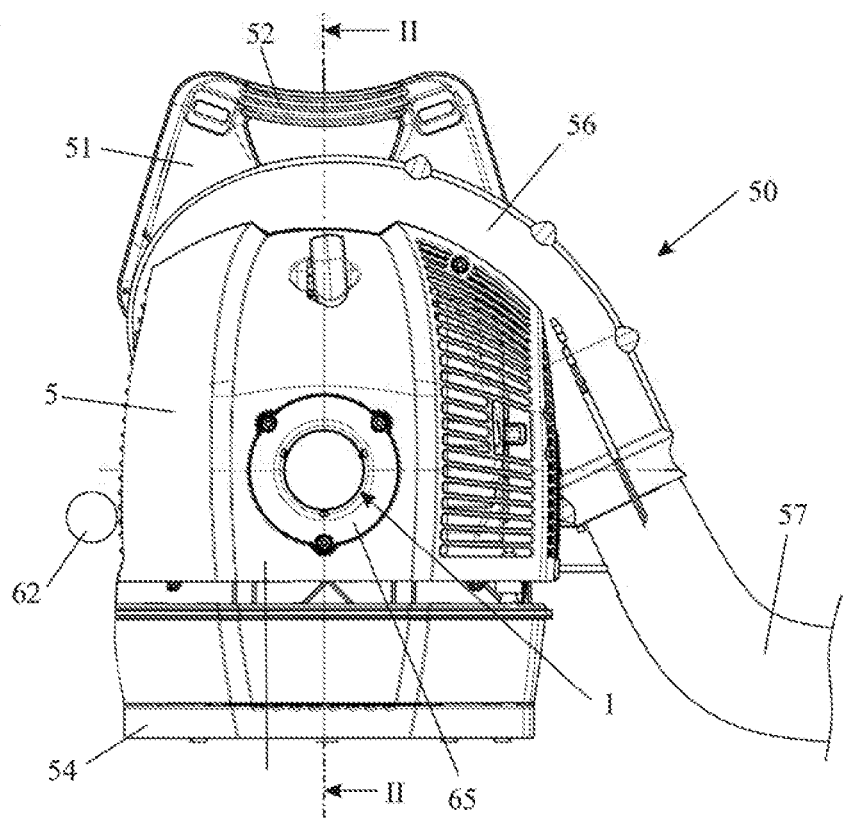
FIG. 1 shows a schematic view of a work apparatus.

FIG. 1 shows, as an embodiment of a work apparatus 50, a blowing apparatus, specifically a backpack-type blowing apparatus. The starting device according to the invention may however also be advantageous in the case of other work apparatuses, in particular in the case of handheld work apparatuses such as chainsaws, brushcutters, angle grinders, handheld blowing apparatuses or the like. The work apparatus 50 has a back carrier 51 on which, in the embodiment, there is formed a carrying handle 52. The work apparatus 50 has a multi-part housing 5. A part of the housing 5 is formed by a starter housing 65, which is part of a starting device 1. FIG. 1 schematically illustrates a starting handle 62 of the starting device 1. The work apparatus 50 furthermore comprises a blower spiral 56, to which a blowing tube 57 is connected. The work apparatus 50 conveys a blowing air stream through the blower spiral 56 and the blowing tube 57, which blowing air stream can be utilized as a working air stream for example for clearing leaves or the like.

Figure 2:
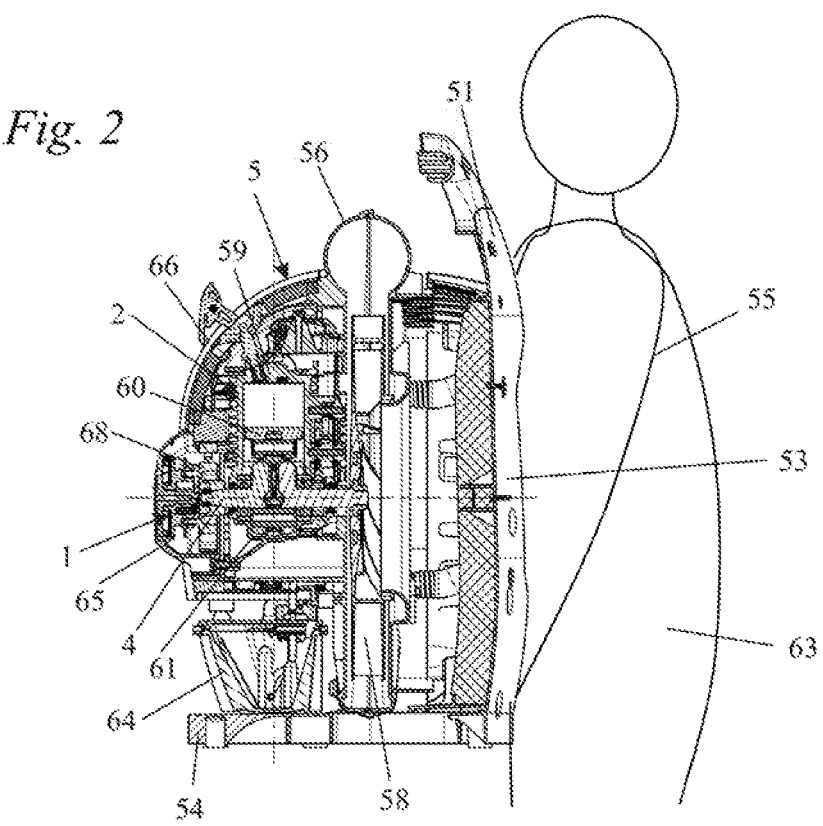
FIG. 2 is a schematic illustration of a section along the line II-II from FIG. 1 in the case of the work apparatus being arranged on an operator.

The back carrier 51 comprises, as shown in particular in FIG. 2, a back plate 53 and a base plate 54. The back carrier 51 is worn by an operator 63 on his or her back using carrying belts 55. In the embodiment, a fuel tank 64 is arranged outside the housing 5. The fuel tank 64 is arranged on the base plate 54. The housing 5 comprises, in addition to the starter housing 65, an engine housing 66 in which a combustion engine 2 is arranged. The combustion engine 2 has a cylinder 59, in which a piston 60 is arranged so as to perform a reciprocating movement. The piston 60 drives a crankshaft 4 in rotation. During operation, the crankshaft 4 drives a blower wheel 58 in rotation, which blower wheel conveys the working air stream. The crankshaft 4 is mounted rotatably in a crankcase 61.

Figure 3:
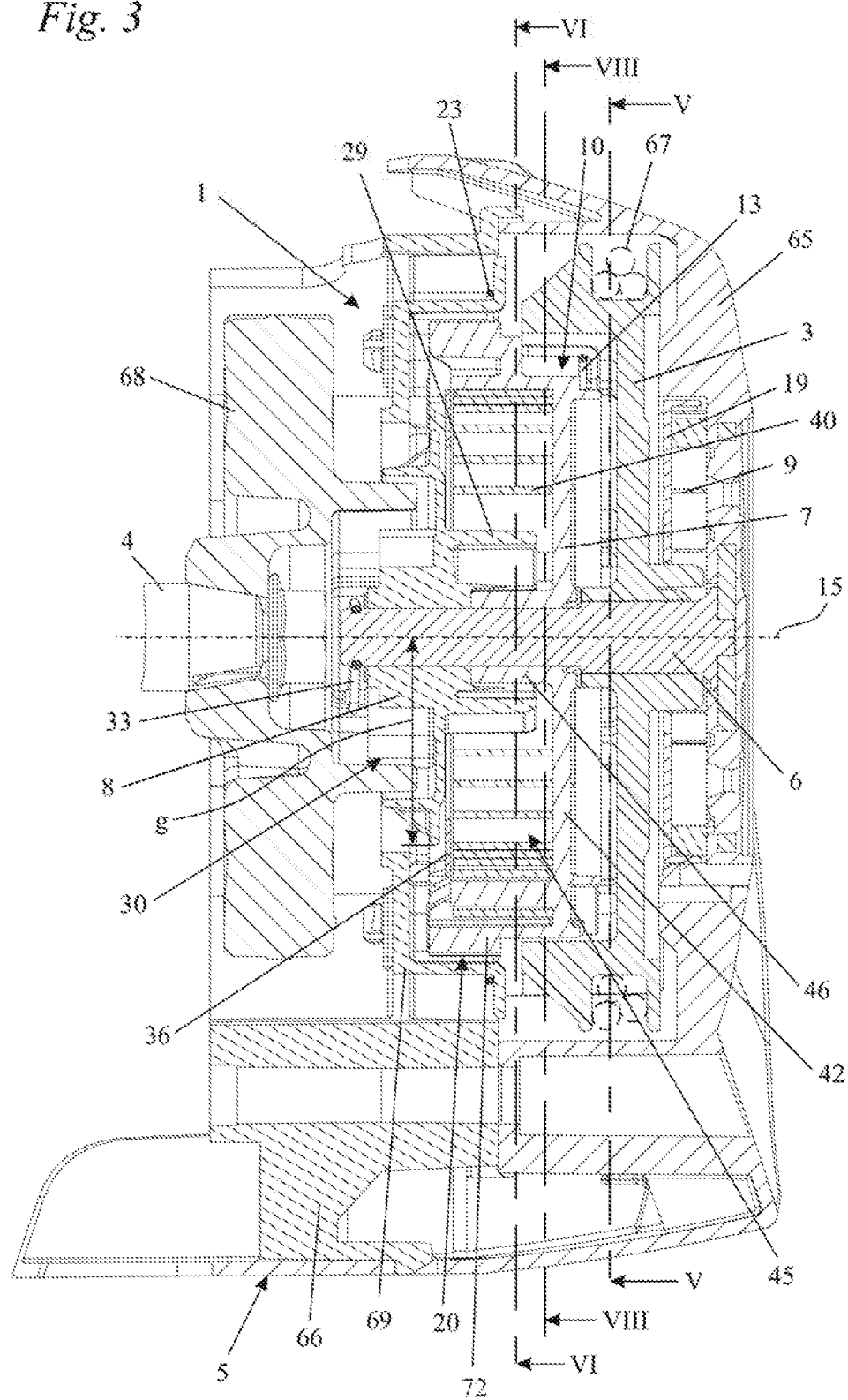
FIG. 3 shows a section through the starting device of the work apparatus from FIGS. 1 and 2 along the line III-III in FIG. 5.

The starting device 1 serves for starting the combustion engine 2. The construction of the starting device 1 is shown in FIG. 3. To the starting handle 62, there is fixed a starting rope 67, which is schematically illustrated in FIG. 3 using a dashed line. To start the combustion engine 2, the operator pulls on the starting handle 62 (FIG. 1). The starting rope 67 is wound on a rope pulley 3 shown in FIG. 3. Pulling on the starting rope 67 sets the rope pulley 3 in rotation in a starting direction 16 (FIG. 4) about a rotational axis 15. The rope pulley 3 is, in the starting direction 16, coupled by means of a first coupling unit 10, also shown in FIG. 4, to a spring housing 7. In the spring housing 7, there is arranged a tension spring 40 which, in the embodiment, is configured as a spiral spring. In the spring housing 7, there is formed a spring receiving space 45 in which the tension spring 40 is arranged. One end of the tension spring 40 is fixedly connected to the spring housing 7. The other end of the tension spring 40 is fixed to an entrainer 8. The entrainer 8 itself is, in the starting direction 16, coupled by means of a third coupling unit 30 to a flywheel 68. The flywheel 68 is connected rotationally conjointly to the crankshaft 4. The spring receiving space 45 is only partially closed off in the direction of the entrainer 8. In the embodiment, a ring-shaped cover plate 36 is provided which partially closes off the spring housing.

When the starting rope 67 is pulled, the rope pulley 3 is set in rotation. By means of the first coupling unit 10, the rope pulley 3 entrains the spring housing 7. The tension spring 40 is thus tightened. The tension spring 40 preloads the entrainer 8 and, via the coupling unit 30, the crankshaft 4 in the starting direction 16. The crankshaft 4 is acted on by an opposing force which is transmitted from the piston 60 to the crankshaft 4 and which is generated by the compressed gas in the combustion chamber. For as long as the force stored in the tension spring 40 is not sufficient to move the piston 60 (FIG. 2) beyond the top dead center of the piston 60 or to start the combustion engine 2, the operator can tighten the tension spring 40 by pulling on the starting rope 67 multiple times.

A second coupling unit 20 acts on the spring housing 7. The second coupling unit 20 acts between the spring housing 7 and a holding plate 69 of the engine housing 66. The holding plate 69 thus forms a part of the engine housing 66 and thus a part of the housing 5. The holding plate 69, the engine housing 66 and the starter housing 65 are arranged so as to be positionally fixed relative to one another. The rope pulley 3, the spring housing 7, the tension spring 40, the entrainer 8 and the flywheel 68 and also the crankshaft 4 are mounted so as to be rotatable relative to the housing 5 about the rotational axis 15. For this purpose, the rope pulley 3, spring housing 7 and entrainer 8 are mounted rotatably on a bearing pin 6. The bearing pin 6 is fixedly connected to the starter housing 65.

The second coupling unit 20 blocks a rotation of the spring housing 7 counter to the starting direction. At the end of a starting throw, the operator can thus release the starting handle 62. The rope pulley 3 is acted on by a return spring 9 which rolls up the rope pulley 3 counter to the starting direction 16. During this rotation in the opposite direction 17 (FIG. 4) which is directed oppositely to the starting direction 16, the rope pulley 3 is decoupled from the spring housing 7 by means of the first coupling unit 10. The rope pulley 3 can rotate relative to the spring housing 7. A backward rotation of the spring housing 7, and thus a relaxation of the tension spring 40, is prevented by the second coupling unit 20.

As is also shown in FIG. 3, the return spring 9 is arranged in a return spring housing 19 which is open to the side averted from the rope pulley 3. The side is closed off by the starter housing 65. As is also shown in FIG. 3, the spring housing 7 has a bearing dome 46, by means of which the spring housing is mounted rotatably on the bearing pin 6. The spring housing 7 has a side wall 42 which, in the embodiment, runs approximately perpendicular to the rotational axis 15. The side wall 42 extends between the bearing dome 46 and a circumferential wall 72 of the spring housing 7. The outer side, facing toward the rope pulley 3, of the side wall 42 is of planar form in the embodiment. The bearing dome 46 projects from the side wall 42 of the spring housing 7 in the direction of the entrainer 8 and of the crankshaft 4. The bearing dome 46 projects into the spring receiving space 45, in which the tension spring 40 is arranged. As is also shown in FIG. 3, an actuation bracket 33 of the third coupling unit 30 is held on the bearing dome 46 adjacent to the entrainer 8. The entrainer 8 has a maximum spacing g to the rotational axis 15. Here, the entrainer 8 is configured to be relatively small, and does not extend beyond the spring housing 7 in the radial direction with respect to the rotational axis 15.

Figure 4:
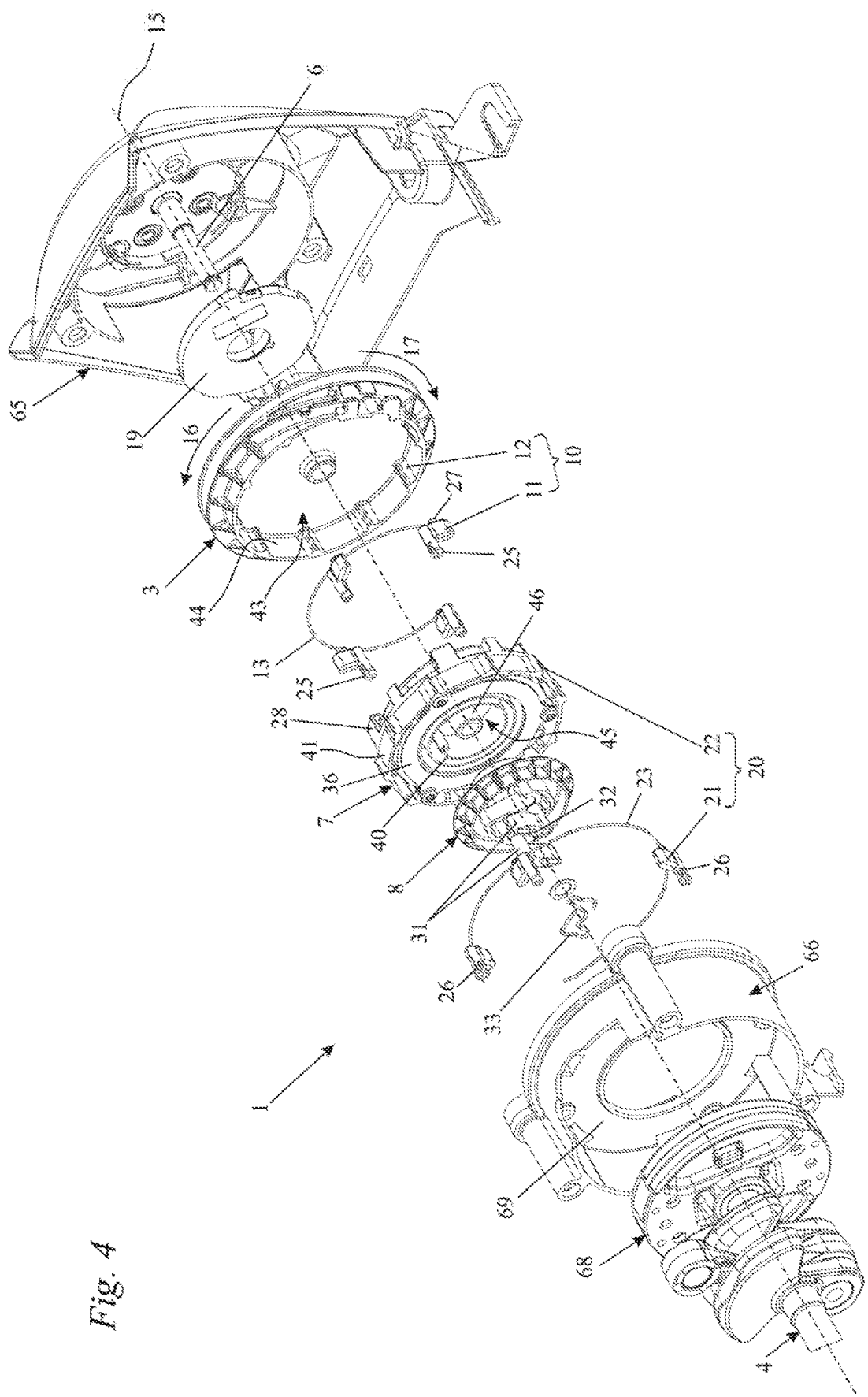
FIG. 4 is an exploded illustration of the starting device in FIG. 3.

FIG. 4 shows the construction of the starting device 1 in detail. The first coupling unit 10 comprises first coupling elements 11 which, in the embodiment, are formed as pivotably mounted latches. The first coupling elements 11 are mounted pivotably on the spring housing 7 by means of bearing pins 25. The first coupling elements 11 have in each case one actuating pin 27. In the embodiment, the actuating pins 27 are preloaded in a radial direction with respect to the rotational axis 15 by a common first spring 13. The actuating pins 27 are acted on by the first spring 13 such that the coupling elements 11 are pushed radially outward. The rope pulley 3 has a recess 43 into which the spring housing 7 projects. The recess 43 has an inner circumferential surface 44, on which second coupling elements 12 are provided. In the embodiment, the second coupling elements 12 are formed as detent cams. It is advantageous for multiple first coupling elements 11 and multiple second coupling elements 12 to be provided. The number of detent cams is preferably considerably greater than the number of latches. The first coupling elements 11 are preloaded by the spring 13 in the direction of the inner circumferential surface 44. The first spring 13 is in the form of a ring segment. Provision may however also be made for only two coupling elements 11 to be acted on by a common spring 13, or for a separate spring to be provided for each coupling element 11. The spring housing 7 has holding arms 28, on which the spring 13 is held.

In an alternative configuration, provision may be made for the first coupling elements 11 to be formed as detent cams and for the second coupling elements 12 to be formed as latches. Some other configuration of the first and second coupling elements 11, 12 may also be advantageous.

Figure 8:
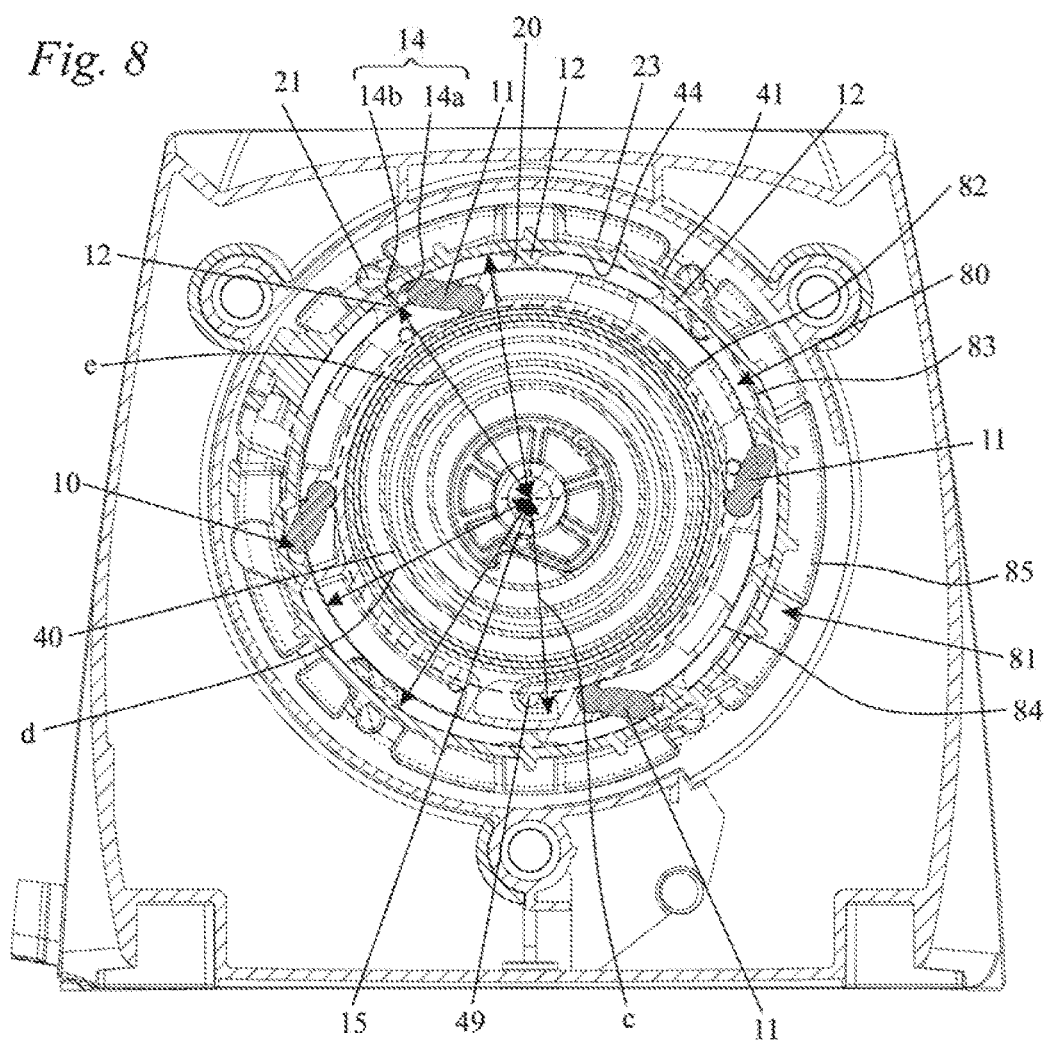
FIG. 8 shows a section along the line VIII-VIII in FIG. 3.

As is also shown in FIG. 4, the bearing dome 46 projects into the spring receiving space 45. The spring housing 7 has an outer circumference 41. Second coupling elements 22 are arranged on the outer circumference 41. Also arranged on the outer circumference 41 are coupling elements 11 of the first coupling unit 10, as is also shown in FIG. 8. In the embodiment, the second coupling elements 22 are formed as detent cams. In the embodiment, the associated first coupling elements 21 are formed as latches. The first coupling elements 21 each have a bearing pin 26, by means of which they are mounted pivotably on the engine housing 66. The first coupling elements 21 each have an actuating pin 27 (FIG. 5), at which they are acted on by a second spring 23. In the embodiment, a single second spring 23 is provided for all first coupling elements 21. The second spring 23 preloads the first coupling elements 21 of the second coupling unit 20 radially inward in the direction of the outer circumference 41 of the spring housing 7. The second spring 23 is in the form of a ring segment. The two springs 13 and 23 are arranged coaxially with respect to one another and coaxially with respect to the rotational axis 15.

Provision may also be made for the coupling elements 11, 21, which in the embodiment are configured as latches, to be formed as detent elements, in particular as detent cams, so as to give rise to an exactly reversed arrangement. It may also be expedient for the coupling elements 11, 21, which in the embodiment are configured as latches, to be formed partially as detent elements, such that exclusively latches or exclusively detent elements are arranged on the spring housing 7, and exclusively detent elements or latches are correspondingly arranged on the rope pulley 3 and/or on the housing 5.

The third coupling unit 30 is provided for connecting the entrainer 8 to the flywheel 68. In the embodiment, the third coupling unit 30 has latches 31 as coupling elements. The latches 31 are mounted on the entrainer 8. During a relative movement of the entrainer 8 with respect to the bearing pin 6 in the starting direction 16, the latches 31 are pivoted outward by the actuation bracket 33, such that the latches 31 can enter into engagement with corresponding detent cams on the flywheel 68.

Figure 5:
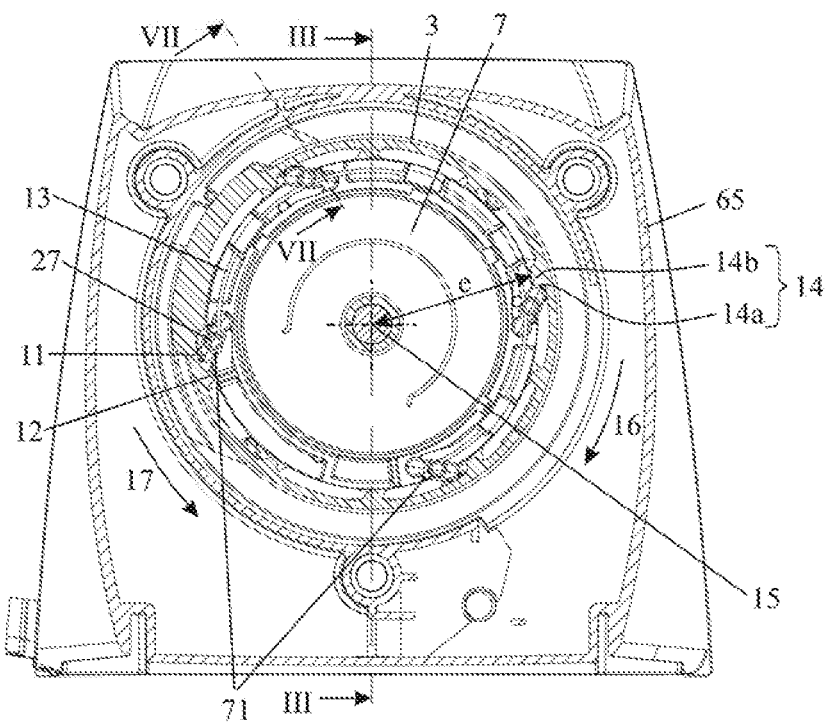
FIG. 5 shows a section along the line V-V in FIG. 3.

As shown in FIG. 5, the first spring 13 has two spring ends 71 which are bent radially outward. In this way, the first spring 13 is secured in the circumferential direction on the two actuating pins 27 situated adjacent to the spring ends 71. As is also shown in FIG. 5, the first coupling elements 11, which in the embodiment are arranged on the spring housing 7, have contact regions 14$a$, and the second coupling elements 12 of the first coupling unit 10, which in the embodiment are arranged on the rope pulley 3, have contact regions 14$b$. In the engaged state of the first coupling unit 10, that is, when a rotation of the rope pulley 3 in the starting direction 16 is transmitted to the spring housing 7 by means of the first coupling unit 10, the contact regions 14$a$ and 14$b$ come into contact with one another at a first contact location 14, and produce a connection, which is rotationally conjoint in the starting direction 16, between rope pulley 3 and spring housing 7. The first contact location 14 has a minimal spacing e to the rotational axis 15. The spacing e is smaller than or equal to the radius of the spring receiving space 45 of the rope pulley 3 and greater than or equal to the radius of the outer circumference 41 of the spring housing 7. In the embodiment, the first contact locations 14 are arranged radially outside the spring receiving space 45, that is, in the same section plane perpendicular to the rotational axis 15 but with a greater radial spacing to the rotational axis 15. The spacing e is greater than the maximum spacing g of the entrainer 8 to the rotational axis 15 (FIG. 3). As viewed in the direction of the rotational axis 15, all of the contact locations 14 are accordingly situated radially outside the entrainer 8. In the event of a rotation of the rope pulley 3 in the opposite direction 17, the second coupling elements 12 deflect the first coupling elements 11 radially inward. As a result, a rotation of the rope pulley 3 relative to the spring housing 7 is possible in the opposite direction 17. As shown in FIG. 5, in the embodiment, four first coupling elements 11 and ten second coupling elements 12 are provided.

Figure 11:
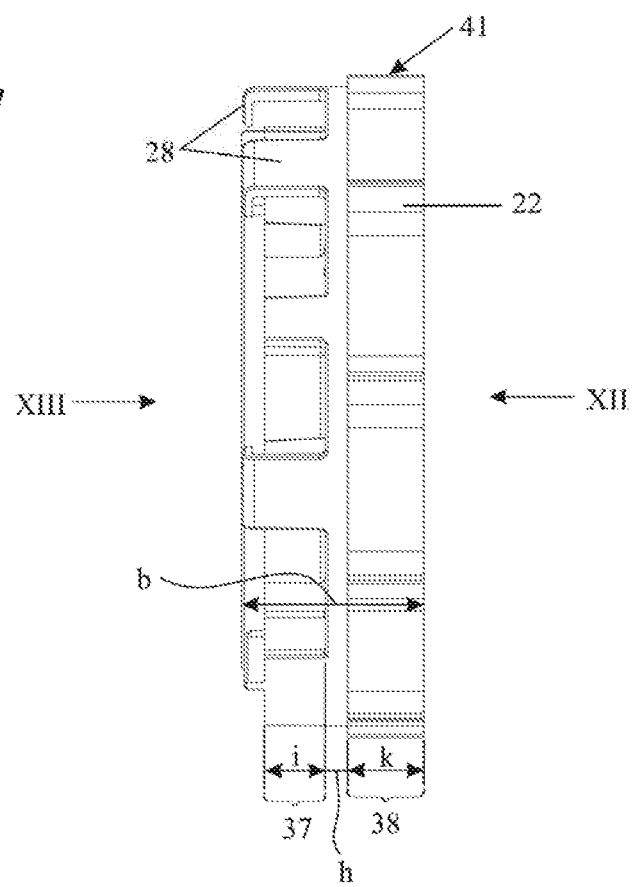
FIG. 11 shows a side view of the spring housing.

As shown in FIG. 11, the spring housing 7 has a first longitudinal section 37 and a second longitudinal section 38. The longitudinal section 37 is the longitudinal section in which the first contact locations 14 are arranged. The longitudinal section 38 is the longitudinal section in which the second contact locations 24 are arranged. The first longitudinal section 37 is also referred to as first axial section. The second longitudinal section 38 is also referred to as second axial section.

Figure 6:
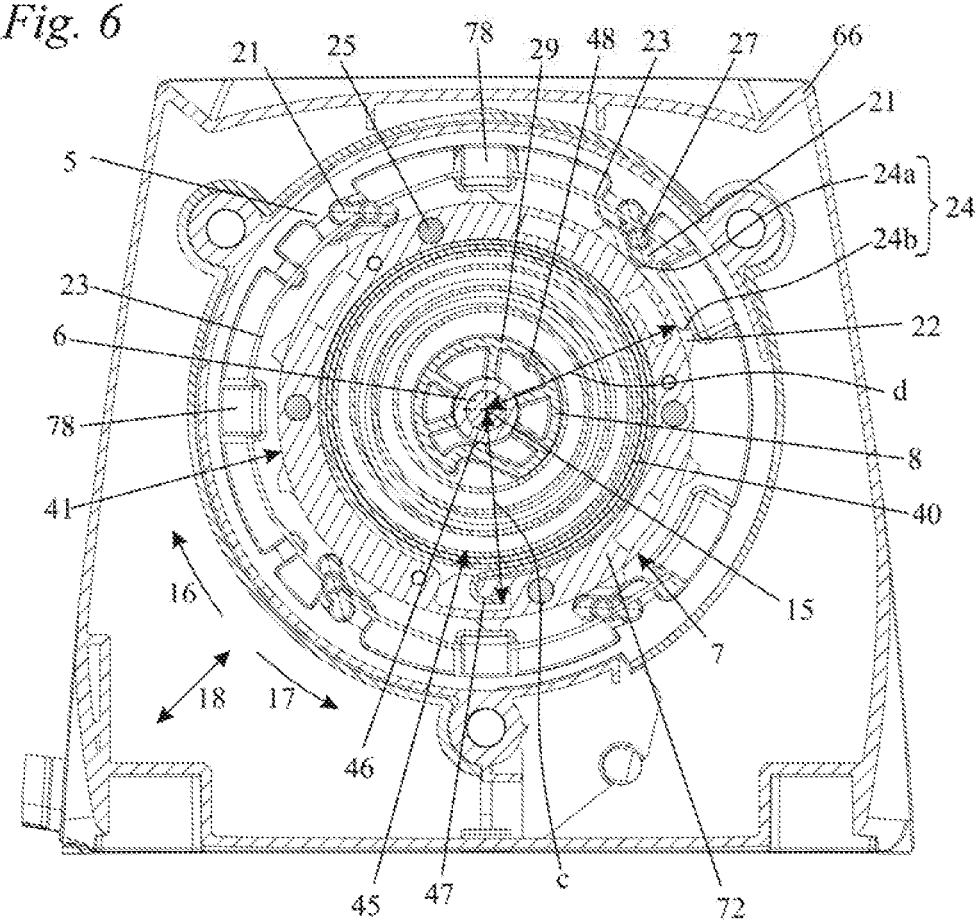
FIG. 6 shows a section along the line VI-VI in FIG. 3.

FIG. 6 shows a section through the spring receiving space 45 of the spring housing 7 in a region between the first longitudinal section 37 and the second longitudinal section 38 of the spring housing 7. As shown in the figure, the tension spring 40 has an outer end 47 and an inner end 48. By means of its outer end 47, the tension spring 40 is hooked in on the circumferential wall 72 of the spring housing 7. By means of its other, inner end 48, the tension spring 40 is hooked in on a hook-in mount 29 of the entrainer 8. As shown in FIG. 2 and FIG. 6, the hook-in mount 29 engages over the bearing dome 46. The entrainer 8 and the bearing dome 46 overlap in the axial direction of the rotational axis 15.

As is also shown in FIG. 6, the bearing pins 25 of the first coupling elements 11 of the first coupling unit 10 are mounted in the circumferential wall 72. The first coupling elements 21 of the second coupling unit 20 are mounted pivotally on the housing 5, in the embodiment on the engine housing 66. On the outer circumference 41 of the circumferential wall 72, the second coupling elements 22 of the second coupling unit 20 are arranged in the second longitudinal section 38. The second coupling elements 22 have contact regions 24$b$. The first coupling elements 21, which in the embodiment are mounted on the housing 5, of the second coupling unit 20 have contact regions 24$a$. The contact regions 24$a$ and 24$b$ are those regions of the coupling elements 21 and 22 which, in the case of a rotationally conjoint connection between the spring housing 7 and the housing 5, come into contact and produce the rotationally conjoint connection. The second contact locations 24 have a minimal spacing d to the rotational axis 15. The smallest spacing d is measured in relation to the radially innermost region of the contact location 24. Here, the spacing d is measured in a radial direction 18, that is, radially with respect to the rotational axis 15.

On the outer circumference of the circumferential wall 72 of the spring housing 7, coupling elements of the first coupling unit 10 are arranged in the first longitudinal section 37 of the spring housing 7, and coupling elements of the second coupling unit 20 are arranged in the second longitudinal section 38.

As is also shown in FIG. 6, the tension spring 40 has a maximum spacing c to the rotational axis 15. In the embodiment, the maximum spacing c is measured to the outer end 47 of the tension spring 40. The spacing d of the second contact locations 24 to the rotational axis 15 is greater than the maximum spacing c of the tension spring 40 to the rotational axis 15. The second contact locations 24 are accordingly situated radially further to the outside than the tension spring 40. In the embodiment, the second contact locations 24 are arranged radially outside the spring receiving space 45, that is, in the same section plane perpendicular to the rotational axis 15, but with a greater radial spacing to the rotational axis 15. The maximum spacing g of the entrainer 8 to the rotational axis 15 is smaller than the spacing e.

As is also shown in FIG. 6, holding arms 78 are arranged on the housing 5, on which holding arms the second spring 23 is held. The second spring 23 acts on the first coupling elements 21 of the second coupling unit 20 in a radially inward direction, that is, in the radial direction 18 in the direction of the rotational axis 15.

If the spring housing 7 is rotated in the starting direction 16, then the second coupling elements 22 deflect the first coupling elements 21 radially outward counter to the force of the second spring 23. The spring housing 7 can thus be rotated relative to the housing 5 in the starting direction 16, and the tension spring 40 can thus be tensioned. A rotation of the spring housing 7 relative to the housing 5 in the opposite direction 17 is blocked by the first coupling elements 21 and the second coupling elements 22. Here, the coupling elements 21, 22 come into contact with one another at second contact locations 24. In the embodiment, four first coupling elements 21 and ten second coupling elements 22 are provided. Some other number of first and/or second coupling elements 21, 22 may also be advantageous. Provision may also be made for the first coupling elements 21 to be formed as detent cams and for the second coupling elements 22 to be formed as latches. Some other configuration of the coupling elements 21, 22 may also be advantageous.

Figure 7:
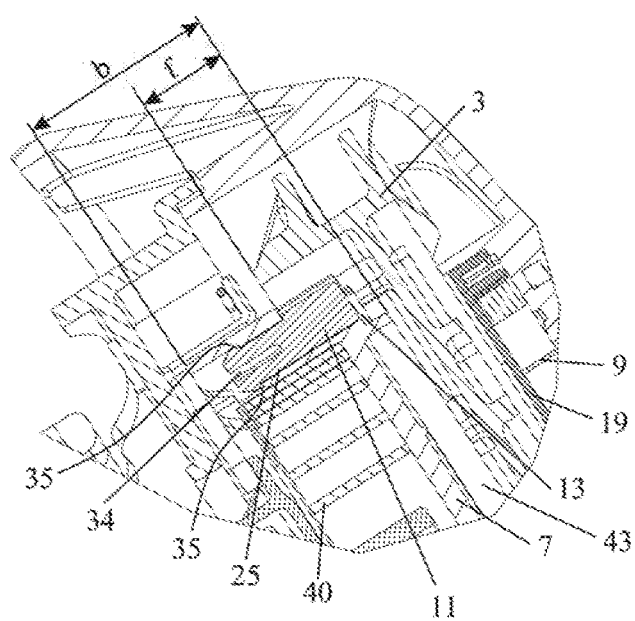
FIG. 7 shows a section along the line VII-VII in FIG. 5.
Figure 10:
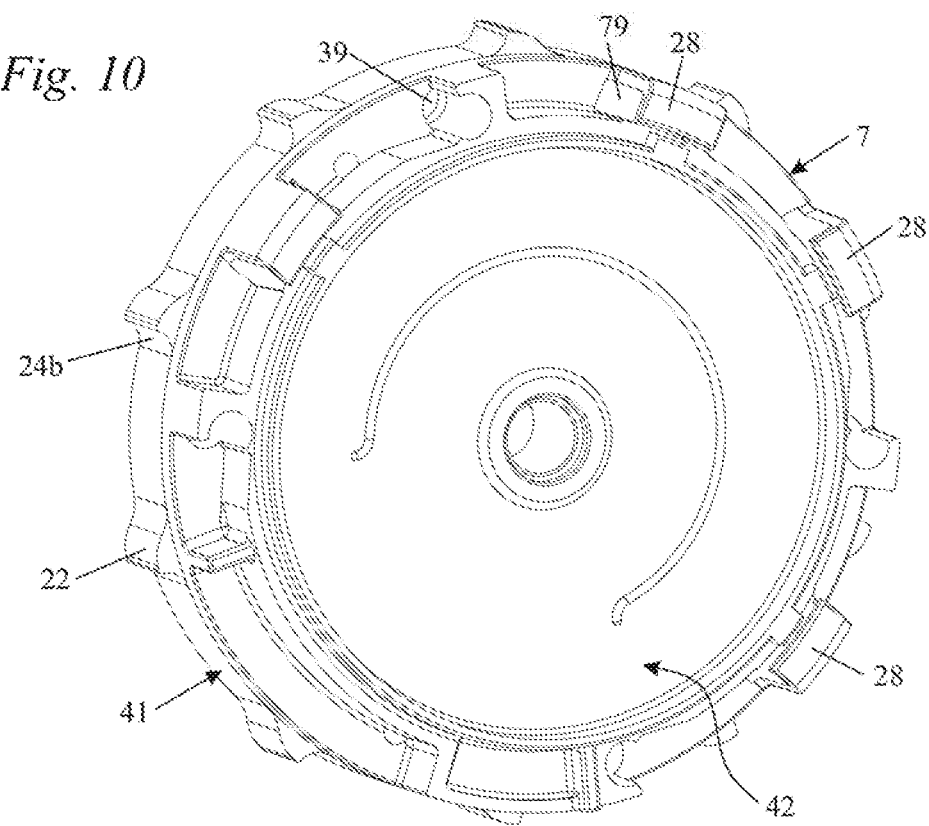
FIG. 10 is a perspective illustration of the spring housing.

As shown in FIG. 7, the bearing pins 25 of the first coupling elements 11 have a slit 34 and detent projections 35. The bearing pins 25 are clipped into receptacle openings 39 of the spring housing 7 (FIG. 10). The bearing pins 26 of the first coupling elements 21 of the second coupling unit 20 are configured correspondingly, and are clipped into corresponding receptacle openings (not shown) of the holding plate 69 of the engine housing 66.

As shown in FIG. 7, the spring housing has a width b measured in the direction of the rotational axis 15. The spring housing 7 projects with the first longitudinal section 37 into the recess 43 of the rope pulley 3. At its outer circumference, the spring housing 7 is partially engaged over by the rope pulley 3. The rope pulley 3 and the spring housing 7 have an axial overlap f which amounts to at least 25%, in particular at least 30%, of the width b of the spring housing 7. The axial overlap f and the width b are in this case measured parallel to one another and in the direction of the rotational axis 15. The axial overlap f results in a small axial structural width of the starting device 1. The axial overlap f advantageously amounts to less than 70%, in particular less than 50%, of the width b.

FIG. 8 shows a section through the first coupling unit 10. Also indicated in FIG. 8 is the first contact location 14 with the contact regions 14*a* and 14*b*. As is also shown in FIG. 8, the second coupling elements 12 of the first coupling unit 10 and the second coupling elements 22 of the second coupling unit 20 are arranged with approximately the same spacing to the rotational axis 15.

All of the coupling elements 11, 12 of the first coupling unit 10 are situated in a first annular space 80. The first annular space 80 extends between an inner boundary 82 and an outer boundary 83, which are indicated in FIG. 8 using dashed lines. All of the coupling elements 21, 22 of the second coupling unit 20 are situated in a second annular space 81. The second annular space 81 extends between an inner boundary 84 and an outer boundary 85, which are indicated in FIG. 8 using dotted lines. The first annular space 80 and the second annular space 81 are situated radially outside the spring receiving space 45. The first annular space 80 and the second annular space 81 at least partially overlap as viewed in the direction of the rotational axis 15. The first coupling unit 10 and the second coupling unit 20 thus overlap in the radial direction of the rotational axis 15. In the axial direction of the rotational axis 15, the two annular spaces 80 and 81 are situated adjacent to one another, in particular adjacent to one another with a small spacing.

Figure 9:
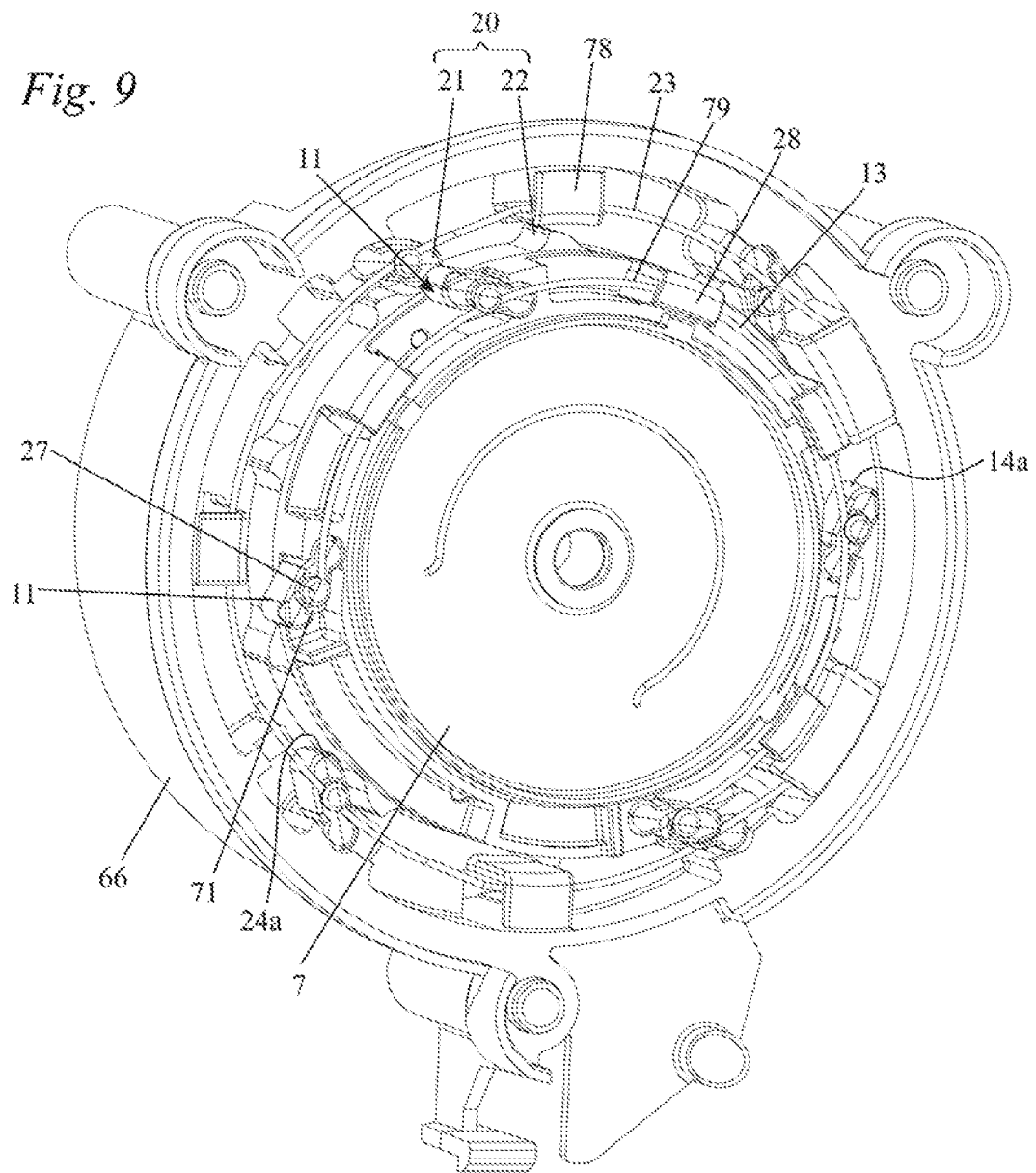
FIG. 9 shows a perspective view of the starting device in a viewing direction from the rope pulley to the spring housing, wherein the rope pulley is not illustrated.

FIG. 9 shows the arrangement of the two coupling units 10 and 20 in detail. Here, of the first coupling unit 10, only the first coupling elements 11 are illustrated. The first coupling elements 11 of the first coupling unit 10 are mounted radially within the contact regions 14*a*. The first coupling elements 21 of the second coupling unit 20 are mounted radially outside the contact regions 24*a*. The latches which form the first coupling elements 11 and the first coupling elements 21 are advantageously of identical form. As shown in FIG. 9 and FIG. 10, demolding openings 79 are formed adjacent to the holding arms 28 on the spring housing 7, such that the holding arms 28 can be produced integrally with the spring housing 7 in a casting process.

FIG. 10 shows the arrangement of the second coupling elements 22 of the second coupling unit 20 in the second longitudinal section 38 on the outer circumference 41 of the spring housing 7. As is also shown in FIG. 10, the spring housing 7 has receptacle openings 39 into which the first coupling elements 11 of the first coupling unit 10 are clipped by way of their bearing pins 25 (FIG. 7).

As shown in FIG. 11, a spacing h is formed between the first longitudinal section 37 and the second longitudinal section 38. The spacing h preferably amounts to approximately 1 mm to 15 mm, in particular less than 5 mm. The width i of the first longitudinal section 37 and the width k of the second longitudinal section 38 are in each case considerably greater than the spacing h. It is preferable for the width i and/or the width k to amount to at least two times, in particular at least three times, the spacing h. It may also be practical for the longitudinal sections 37 and 38 to adjoin one another without a spacing. To realize a short axial structural length, the spacing h must be minimized. The width i of the first longitudinal section 37 corresponds to the width of the first contact locations 14 and in particular to the width of the contact regions 14*a* on the first coupling elements 11 of the first coupling unit 10. The width k corresponds to the width of the second contact locations 24 and in particular to the width of the second coupling elements 22 of the second coupling unit 20. The width i and the width k may be approximately equal. The longitudinal sections 37 and 38, in which the contact locations 14 and 24 of the first coupling unit 10 and of the second coupling unit 20 respectively are arranged, advantageously do not overlap in the direction of the rotational axis 15. The widths i and k and the spacing h and the width b are each measured parallel to the rotational axis 15 (FIG. 3). The sum of the width i and of the width k advantageously amounts to at least 70%, in particular at least 80%, of the width b of the spring housing 7.

The axial overlap f (FIG. 7) of the spring housing 7 with the rope pulley 3 is advantageously at least as large as the length i of the first longitudinal section 37. The first longitudinal section 37 in particular protrudes entirely into the recess 43 (FIG. 4) of the rope pulley 3. The spring receiving space 45 advantageously extends in the axial direction of the rotational axis 15 over both longitudinal sections 37 and 38 of the spring housing 7. The spring receiving space 45 advantageously protrudes into the recess 43 (FIG. 4) of the rope pulley 3, wherein, in the axial direction of the rotational axis 15, the side wall 42 of the spring housing 7 is situated directly adjacent to the rope pulley 3 and, in the radial direction, the first coupling unit 10 is arranged between the spring receiving space 45 and the inner circumferential surface 44 (FIG. 4) of the rope pulley 3.

Figure 12:
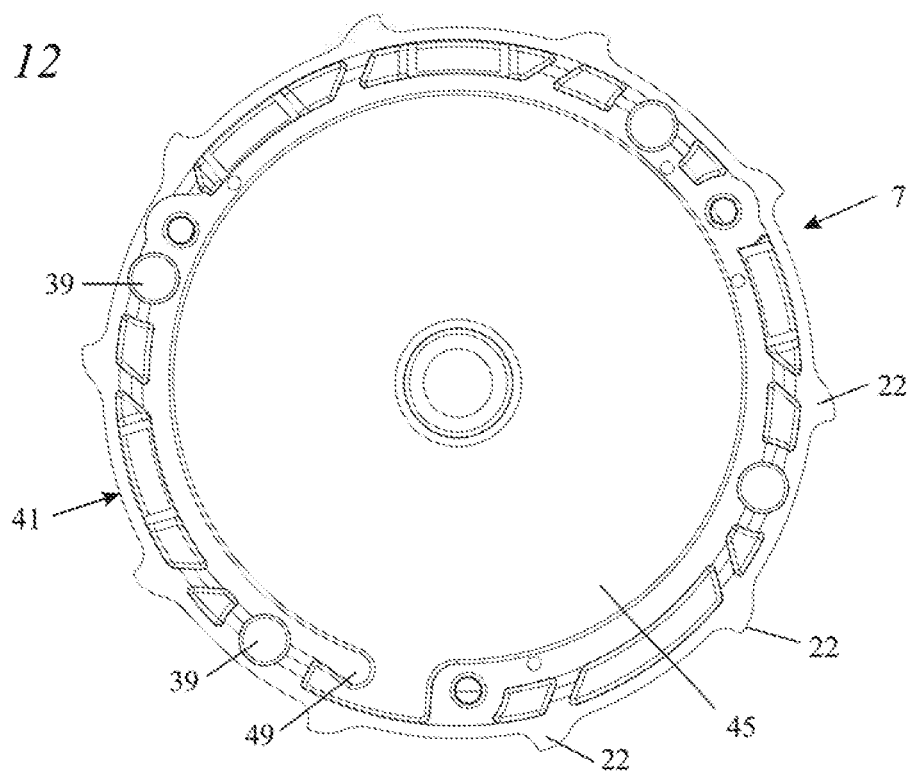
FIG. 12 shows a side view of the spring housing in the direction of the arrow XII-XII in FIG. 11; and, FIG. 13 shows a side view of the spring housing in the direction of the arrow XIII-XIII in FIG. 11.
Figure 13:
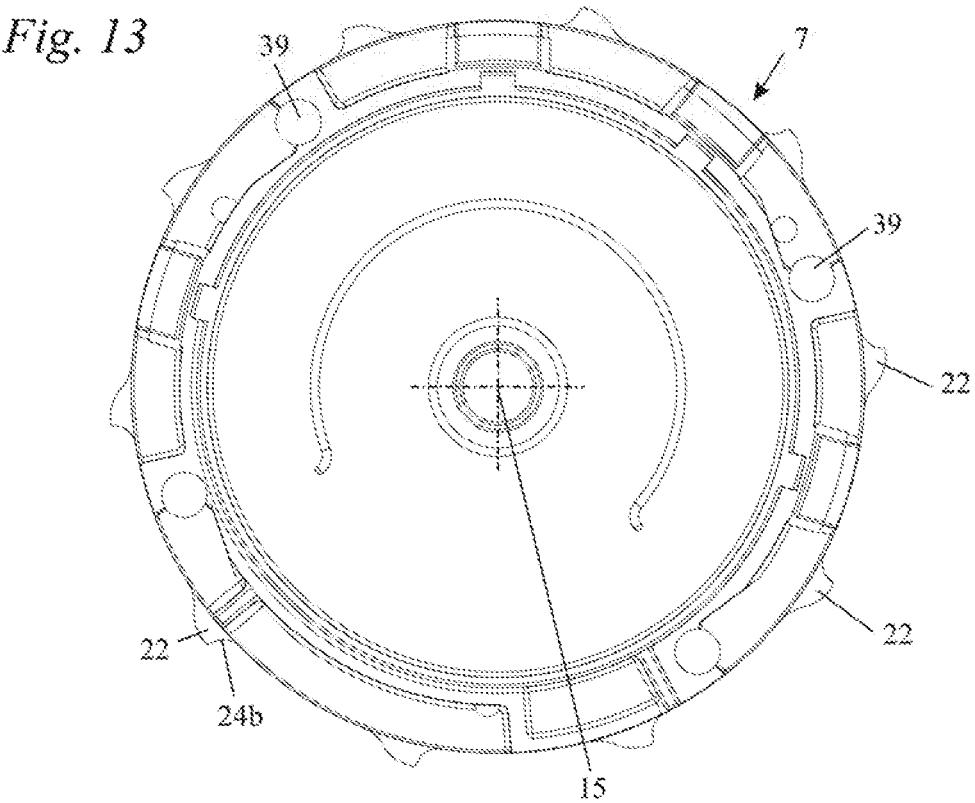

As shown in FIG. 12, the spring housing 7 has a hook-in section 49 for the hooking-in of the outer end 47 of the tension spring 40. The second coupling elements 22 are arranged in uniformly distributed fashion on the outer circumference 41 of the spring housing 7. This is also shown in FIG. 13. As shown in FIGS. 12 and 13, the receptacle openings 39, which form the mounting locations for the first coupling elements 11, are arranged radially outside the spring receiving space 45, and in the embodiment so as to axially overlap the spring receiving space 45.

It is understood that the foregoing description is that of the preferred embodiments of the invention and that various changes and modifications may be made thereto without departing from the spirit and scope of the invention as defined in the appended claims.

What is claimed is:

1. A starting device for starting a combustion engine, the starting device comprising:
   a starter housing defining a rotation axis;
   a rope pulley, a spring housing and an entrainer each being rotatably mounted so as to rotate about said rotation axis relative to said starter housing;
   said rope pulley being rotatable in a starting direction about said rotation axis;
   a return spring mounted between said starter housing and said rope pulley so as to cause said return spring to become tensioned about said rotation axis in response to a rotational movement of said rope pulley in said starting direction;
   a first coupling unit configured to establish a rotation-fixed connection between said rope pulley and said spring housing in response to a rotational movement of said rope pulley in said starting direction;
   said first coupling unit being further configured to act as a freewheel between said rope pulley and said spring housing in response to rotational movement of said rope pulley in a second direction opposite to said starting direction;
   a tension spring;
   said spring housing having an outer periphery and defining a spring receptacle for accommodating said tension spring therein;
   said spring housing being connected to said entrainer via said tension spring;
   a second coupling unit arranged on said outer periphery of said spring housing;
   said second coupling unit being configured to act as a freewheel between said spring housing and said starter housing in response to a rotational movement of said rope pulley in said starting direction and to prevent a rotational movement of said spring housing relative to said starter housing in said second direction;
   said entrainer being provided for coupling said starting device to a motor shaft of said combustion engine;
   said first coupling unit including at least one first coupling element and at least one second coupling element;
   said at least one first coupling element and said at least one second coupling element coacting at least at one first contact location when establishing said rotation-fixed connection; and,
   said at least one first contact location being at a distance (e) to said rotation axis which is at least as large as a maximum distance (c) of said tension spring to said rotation axis.

2. The starting device of claim 1, wherein said first coupling unit and said tension spring mutually overlap in axial direction of said rotation axis.

3. The starting device of claim 1, wherein said rope pulley has a concave inner peripheral surface; one of two coacting coupling elements of said first coupling unit is arranged on said spring housing; and, the other one of the two coacting coupling elements of said first coupling unit is arranged on said concave inner peripheral surface of said rope pulley.

4. The starting device of claim 1, wherein said second coupling unit includes at least one first coupling element and at least one second coupling element; and, said at least one first coupling element of said second coupling unit and said at least one second coupling element of said second coupling unit coact at least at one second contact location when preventing a rotational movement of said spring housing in the second direction opposite to said starting direction.

5. The starting device of claim 4, wherein said at least one second contact location is at a distance (d) to said rotation axis; and, said distance (d) is at least as large as said maximum distance (c) of said tension spring to said rotation axis.

6. The starting device of claim 4, wherein said at least one second contact location is at a distance (d) to said rotation axis; said entrainer has a largest distance (g) to said rotation axis; and, said largest distance (g) is less than said distance (e) of said at least one first contact location to said rotation axis and less than said distance (d) of said at least one second contact location to said rotation axis.

7. The starting device of claim 4, wherein said at least one first coupling element of said first coupling unit and said at least one coupling element of said second coupling unit are respective detents; said at least one second coupling element of said first coupling unit and said at least one second coupling element of said second coupling unit are respective catch cams; and, said at least one detent of said one coupling unit and said at least one catch cam of said other coupling unit are arranged on said spring housing.

8. The starting device of claim 4, wherein said first contact location of said first coupling unit is arranged in a first axial section of said starting device and said second contact location of said second coupling unit is in a second section of said starting device; and, said first axial section and said second axial section are non-overlapping in the direction of said rotation axis.

9. The starting device of claim 1, wherein at least one coupling element mounted on said spring housing is a detent and the mounting location of said at least one detent mounted on said spring housing is arranged radially outside of said spring receptacle referred to the rotation axis.

10. The starting device of claim 1, wherein said first coupling unit and said second coupling unit mutually overlap in a radial direction of said rotation axis.

11. The starting device of claim 1, wherein said spring housing and said rope pulley mutually overlap in the axial direction of said rotation axis.

12. The starting device of claim 1, wherein said spring housing has a width (b) measured in the direction of said rotation axis; said rope pulley has a recess into which said spring housing projects; and, said rope pulley and said spring housing conjointly define a mutual overlapment which amounts to at least 25% of said width (b) of said spring housing.

13. The starting device of claim 1, wherein said spring housing has a bearing dome for journaling said spring housing on a bearing lug of said starter housing; and, said bearing dome projects into said spring receptacle of said spring housing.

14. The starting device of claim 13, wherein said entrainer overlaps the bearing dome of said spring housing in axial direction of the rotation axis.

15. The starting device of claim 1, wherein at least one of said first and second coupling units has a single spring and has at least two first coupling elements charged by said single spring.

16. The starting device of claim 15, wherein said single spring has a form of a ring segment; and, said single spring is arranged so as to charge said at least two first coupling elements in a radial direction toward said rotation axis.

17. A work apparatus comprising:
a combustion engine having a crankshaft;
a starting device for starting said combustion engine; and, said starting device including:
a starter housing defining a rotation axis;
a rope pulley, a spring housing and an entrainer each being rotatably mounted so as to rotate about said rotation axis relative to said starter housing;
said rope pulley being rotatable in a starting direction about said rotation axis;
a return spring mounted between said starter housing and said rope pulley so as to cause said return spring to become tensioned about said rotation axis in response to a rotational movement of said rope pulley in said starting direction;
a first coupling unit configured to establish a rotation-fixed connection between said rope pulley and said spring housing in response to a rotational movement of said rope pulley in said starting direction;
said first coupling unit being further configured to act as a freewheel between said rope pulley and said spring housing in response to rotational movement of said rope pulley in a second direction opposite to said starting direction;
a tension spring;
said spring housing having an outer periphery and defining a spring receptacle for accommodating said tension spring therein;
said spring housing being connected to said entrainer via said tension spring;
a second coupling unit arranged on said outer periphery of said spring housing;
said second coupling unit being configured to act as a freewheel between said spring housing and said starter housing in response to a rotational movement of said rope pulley in said starting direction and to prevent a rotational movement of said spring housing relative to said starter housing in said second direction;
said entrainer being provided for coupling said starting device to a motor shaft of said combustion engine;
said first coupling unit including at least one first coupling element and at least one second coupling element;
said at least one first coupling element and said at least one second coupling element coating at least at one first contact location when establishing said rotation-fixed connection;
said at least one first contact location being at a distance (e) to said rotation axis which is at least as large as a maximum distance (c) of said tension spring to said rotation axis;
said work apparatus further including a third coupling unit for coupling said starting device to said crankshaft; and,
said third coupling unit including coupling elements arranged on said entrainer.

* * * * *

UNITED STATES PATENT AND TRADEMARK OFFICE
CERTIFICATE OF CORRECTION

PATENT NO. : 10,954,910 B2
APPLICATION NO. : 16/356861
DATED : March 23, 2021
INVENTOR(S) : Densborn et al.

Page 1 of 1

It is certified that error appears in the above-identified patent and that said Letters Patent is hereby corrected as shown below:

In the Claims

In Column 14:
Line 35: delete "coating" and insert -- coacting -- therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*